US009789573B2

(12) United States Patent
Forlong

(10) Patent No.: US 9,789,573 B2
(45) Date of Patent: Oct. 17, 2017

(54) CUTTING MACHINE TABLE MANUFACTURING METHOD

(75) Inventor: Murray Houlton Forlong, Auckland (NZ)

(73) Assignee: EIGEN SYSTEMS LIMITED, Albany (NZ)

( * ) Notice: Subject to any disclaimer, the term of this patent is extended or adjusted under 35 U.S.C. 154(b) by 416 days.

(21) Appl. No.: 14/241,222

(22) PCT Filed: Aug. 31, 2012

(86) PCT No.: PCT/NZ2012/000153
§ 371 (c)(1),
(2), (4) Date: Feb. 26, 2014

(87) PCT Pub. No.: WO2013/073962
PCT Pub. Date: May 23, 2013

(65) Prior Publication Data
US 2014/0203485 A1    Jul. 24, 2014

(30) Foreign Application Priority Data

Sep. 2, 2011  (NZ) ......................................... 594986
Oct. 21, 2011 (NZ) ......................................... 595923

(51) Int. Cl.
*B23Q 3/00*   (2006.01)
*B23Q 1/03*   (2006.01)
(Continued)

(52) U.S. Cl.
CPC ............ *B23Q 1/03* (2013.01); *B23K 37/0461* (2013.01); *B23P 11/00* (2013.01); *Y10T 29/49963* (2015.01)

(58) Field of Classification Search
USPC ........................................................ 269/309
See application file for complete search history.

(56) References Cited

U.S. PATENT DOCUMENTS 4,493,967 A    1/1985  Wolfe
4,672,172 A *  6/1987  Pearl .................. B23K 26/0846
                                                    198/816
(Continued)

FOREIGN PATENT DOCUMENTS

DE         19501990 A1    7/1996
DE      EP 2468446 A1 *   6/2012   ......... B23K 26/0876

*Primary Examiner* — Larry E Waggle, Jr.
*Assistant Examiner* — Alvin Grant
(74) *Attorney, Agent, or Firm* — Greer, Burns & Crain, Ltd.

(57) ABSTRACT

A cutting table is provided for supporting flat metal plate to be processed, wherein the support table includes at least one module including: at least two longitudinal end plate members which extend along a longitudinal X axis and are spaced apart a transverse distance Y; and a plurality of spaced apart flat bar members (bar members) which are supported by the end plate members and which span distance Y between the end plate members; wherein the side end plate members and bar members of the module are oriented so that the plane of the end plate members and the bar members all have, in use, a vertical orientation; wherein furthermore in use, the bar members support a sacrificial interlocking grid assembly configured to support the plate to be machined.

15 Claims, 7 Drawing Sheets

(51) Int. Cl.
*B23K 37/04* (2006.01)
*B23P 11/00* (2006.01)

(56) References Cited

U.S. PATENT DOCUMENTS

| | | | |
|---|---|---|---|
| 6,095,025 | A | 8/2000 | Mirabello |
| 6,222,155 | B1* | 4/2001 | Blackmon ............... B23K 7/002 219/121.39 |
| 6,300,592 | B1 | 10/2001 | Ulrich et al. |
| 6,727,457 | B1* | 4/2004 | Vande Berg ............ B08B 15/00 219/121.39 |
| 7,560,064 | B1* | 7/2009 | Crees .................... B23K 7/002 266/48 |
| 2002/0030041 | A1* | 3/2002 | Virtanen ............... B23K 26/046 219/121.71 |
| 2003/0080096 | A1* | 5/2003 | Yamaguchi ........ B23K 37/0461 219/121.39 |
| 2005/0067054 | A1* | 3/2005 | Alexin ............... B23K 37/0461 148/194 |
| 2007/0000886 | A1 | 1/2007 | Yamazaki et al. |
| 2008/0083123 | A1 | 4/2008 | Hayashi et al. |
| 2010/0064870 | A1 | 3/2010 | Olsen |
| 2010/0301019 | A1* | 12/2010 | Vos .................... B23K 37/0258 219/121.39 |
| 2011/0183594 | A1* | 7/2011 | Toben .................... B23K 10/00 454/66 |
| 2012/0013661 | A1* | 1/2012 | Smelser ............. B23K 26/0084 347/9 |
| 2012/0018495 | A1* | 1/2012 | Corcoran ............. B23K 31/022 228/170 |
| 2014/0263206 | A1* | 9/2014 | Blevins ................ B23K 10/006 219/121.56 |

* cited by examiner

CUTTING MACHINE TABLE MANUFACTURING METHOD

The invention relates to a system to enable the support table for profile plate cutting machines, to be made simply and with minimum skill level whilst still being sufficiently strong to support heavy loads. The invention is directed particularly but not solely towards a cutting table design that enables the cutting table to be manufactured in a modular way that breaks down for shipping.

BACKGROUND

Many parts profiles that require to be cut from large plates require various types of processes to be performed on each part. Typically these processes require the plate being cut to be supported horizontally by a cutting table.

Many parts or profiles that require to be cut from large metal plates are supported by a cutting table having table supports, of steel and require various types of processes to be performed on each part on a profile cutting machine. Typically the part will require a process to sever the part profile from a parent plate such as by thermal cutting means.

Typically on a profile cutting machine, the bridge of the machine is often fitted with oxy fuel and plasma cutting torches and can also be fitted with high speed spindles for machining operation.

Currently cutting tables are made by making a frame or structure which then supports a platform of sacrificial steel slats that deteriorate over time as plates are cut above them. Typically to support thick steel of up to 12" thick requires the frame of the cutting table to be fabricated and welded with skilled workers and generally requires that the frame is manufactured from heavy structural steel sections.

Typically the cutting tables that cut the thick plates (which can be called heavy plate) are between 8' and 12' wide and often have lengths from 20' to 200' long. Due to the size of these cutting tables it is very difficult to transport assembled cutting tables and so these tables require significant on site assembly and fabrication requiring highly skilled on site final assembly.

Cutting machines that are fitted with oxy fuel torches only do not generally require fume extraction as the fumes generated are minimal. Cutting machines that use plasma cutting torches often generate significant amounts of fumes and require that these fumes are extracted to a filter system that removes the fumes and exhausts clean air. Cutting tables for heavy plate means that many cutting table support legs are required which makes it too difficult to extract the fumes from underneath the table.

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

Object

It is an object of the invention is to enable large cutting tables sufficiently strong to support thick plate to be manufactured off site and sent to the customer for simple assembly and reduces the onsite time by skilled workers. Additionally the cutting table is manufactured from modular parts manufactured from flat steel plate rather than requiring structural sections to cope with the very high loads due to the plate loading.

SUMMARY

In a first embodiment the invention comprises a cutting table for supporting or suspending plate while being processed by a profile plate cutting machine, the cutting table including a modular construction made up from several interlocking and connected components including a supporting frame assembly and sacrificial grid assembly, the cutting table having an area defined by a longitudinal length defining a horizontal plane with a X axis commensurate with the sides of the table and a width in the horizontal plane at right angles to the X axis defining a Y axis, and sides being parallel to the X axis and ends being transverse to the sides, with an upper end relating to the end closest to a plate being cut, and the supporting frame assembly includes structural support bar members which supports and connects to the sacrificial interlocking grid assembly being removably connected together by slotted connecting means to form the cutting table wherein the sacrificial interlocking grid assembly includes a plurality of first cross slat elongate members and second cross slat members being slidably interwoven with each other in a slotted type arrangement to form a sacrificial grid of parallel spaced members wherein each of the first cross slats of the interlocking grid members sit directly on and parallel to a planar structural support bar members 22 that can support the heavy loads of the plate being cut.

Preferably the structural support bar members 22 are spatially located on top of and at right angles to side rail members 8 and extend over at least the width and length of the cutting table, to provide direct support for the sacrificial grid assembly wherein the structural support bar members 22 are protected by the parallel first cross slats and a capping member 26 and end cap member 23 which are connected together to form a structural frame.

Preferably there a cross bar capping member 26 is shaped to cover the top of the structural support bar members 22 underneath the cross slats and is sacrificial during cutting processes but protects structural support bar 22 from process waste.

Preferably the first and second cross slat members are formed as planar strips of metal having upper and lower edges with spaced slots therein and being oriented and slotted together to form the grid having a substantially uniform height from edge to edge wherein the first and second cross slat members are oriented on their edges whereby the first cross slats are oriented in parallel spaced configuration in one direction and the second cross slats are oriented in parallel spaced configuration in an other direction wherein the second cross slats have slots which are slidably received by the structural support bar members.

Preferably the supporting frame assembly includes side rail members 6 to provide bottom support and table positioning, side plate members 8 and gussets 9 wherein the side rail members 6 are arranged in a parallel spaced format lengthwise to form a perimeter sides of the cutting table, wherein the side plate members 8 are supported by the gusset plates 9 to enable lateral stability to be provided and the side plate members 8 are spaced above the substrate or floor.

Preferably the cutting table is constructed with side plate members 8 and gusset members 9 whereby the side plate members 8 are kept straight by the side rail members 6 which are bolted and sealed to a concrete floor, so that any heavy load is directed down through the first cross slats 24 to the side plate members 8 and then to side rail members 6.

Preferably the side rail members 6 are connected at their ends by an end side rail cross member.

Preferably the structural support bar members 22 are spatially located on top of and at right angles to the side rail members 6 and extend over at least the width and length of the cutting table, to provide direct support for the sacrificial grid assembly wherein the structural support bar members 22 are protected by the parallel first cross slats and a capping member 26.

Preferably the structural support bar members 22 are end supported by an end interlocking end plate 23 to enable removal of sections of the table Preferably the interlocking grid assembly slidably interfits on top of the structural support bar members 22.

Preferably the side rail members 6 comprise an elongate flat steel plate member having edges whereby there can be side rail members and at least one middle rail member 15 which are in use oriented on their edges.

Preferably each structural support bar member 22 comprises an elongate straight plate member having edges which are in use oriented on their edges.

Preferably each gusset plate members 9 are planar members having edges, located and connected to an outside surface of the side rails to extend at right angles to the side rail members wherein the gusset plate members are positioned on their edges and are located to provide vertical stiffness to the side rail members 6 and are supported on a substrate or floor.

Preferably first slat members are supported at their ends in slots in a longitudinal elongate support member 12.

Preferably there is a cross bar capping member 26 shaped to cover the top of the cross bar members 22 and is sacrificial during cutting processes but protects each structural support bar member 22 from process waste.

Preferably the cutting table includes a step capping member 27 which is located on and connected to an outer surface of the gusset members 9 and cover the top edge end of gusset 9.

Preferably the sacrificial interlocking grid assembly includes interlocking cross slotted slats 24 & 25 inter woven oriented on their edges.

Preferably, the components of the cutting table are manufactured from flat steel plates with simple folds where required.

Preferably the components of the cutting table are cut, drilled and tapped while in flat form.

Preferably the cutting table uses flat steel bars held vertically as the structure to provide the strength to support high loads from heavy plates being supported.

Preferably the cutting table is simple to assemble and is modular so that additional length can be provided using modular parts.

Preferably there is a gusset capping member 29 for covering and connecting to the top of all of the gusset members 9 to stabilize them which are oriented longitudinally parallel a wherein the gusset capping member 29 is an elongate member being located at a height corresponding to the underneath of the plate 5 being cut.

Preferably the side rail members 6 are angle members, side plate members 8 are flat plate members and the structural support bar members 22 are plate members larger in depth and thickness than the first and second cross slate members 24 and 25.

In a second embodiment the invention comprises a method for assembling a cutting table for supporting plate being processed by a cutting machine, the assembling including the following sequence of steps:

Bolt with secure connections side rail members "L" shaped section 6 and central support member 7 to a concrete floor and parallel with guide rails 1 for the gantry, arrange and connect spaced gusset plate members 9 on to an outside of the side plate members 8 on the floor or ground and connect thereto to laterally support an outer side of side plate members 8 to form a combined member, lower the combined member on to an outer side of each side rail members 6 whereby side rail member 6 locates side plate members 8 in the Y direction using a slot 32 provided between side plate member 8 and gusset plate member 9, Adjust jacking points at 10 and II to horizontally level side plate members 8 such that each side rail member 8 is guided vertically by slot 32 and moved vertically to raise each side plate member 8 to the correct height and jack 10 can ensure that side rail 8 is vertical, Locate support member 31 and support member 16 parallel to the top of side rail 8 such that support member 31 is a guide for a moving trolley 18 and support member 16 is a support guide for the chain drive for trolley 18, Locate elongate folded plate members 14 and 13 onto side plate member 8 such that elongate folded plate members 13 and 14 are parallel and form a closed chamber the length of the cutting table to enable fume extraction through these chambers, Arrange and locate a slotted interlocking end plate 23 to structural support bar members 22 such that a single manageable frame is created and is able to be lifted and located into the cutting table and fitted with sacrificial protection strip 26, (see Detail Q).

Arrange and locate grid assembly 24 and 25 by being firstly assembled in a criss-cross or interwoven pattern and then put on top of and slotted into the structural support bar members 22 whereby the top of the grid assembly forms the top of the cutting table whereby each first cross slat is directly supported by a structural support bar member 22.

Preferably after positioning the gusset members with side plate members 8 onto side rail members 6, locate end gusset cross rail connecting members 9a to connect the end gussets 9 together.

Preferable after forming and locating the side rail members and before locating the spacer bar members and bar members, assemble an intermediary rail member 15 and then place in between and parallel to the side rail members.

Preferable middle rail members 7 or 15 can be placed in between the side rail members 6.

Preferably a gusset plate capping member 29 can be placed only on top of the gusset plate members after the gusset plate members have been installed.

Preferably a folded step capping member 27 can be placed on the sides of the gusset plate members 9 after the gusset plate members have been installed.

In a third embodiment the invention comprises a method for assembling a cutting table for supporting plate being processed by a cutting machine, the assembling including the following sequence of steps:

1. Put in side rail members 6, in a straight formation and fix to floor;

2. If required for additional support put in middle rail 7, level and bolt to floor;
3. Put in intermediate support member 15 if required;
4. Weld Drive chain return supports 16 and 31 to side plate members 8;
5. Weld side plate members 8 with gusset members 9;
6. Lower (side plate member 8 combined with gusset plate members 9) onto side rail member 6, into slot 32;
7. Jack up assembly to be level and with side plate members 8 vertical using jacking bolts;
8. Weld extraction chamber folding member 13 to side rail members 6;
9. Bolt extraction chamber member 14 to 8 and extraction chamber member 14 to extraction chamber member 13;
10. Weld side rail members 6 to side plate members 8 to take the vertical load rather than the jacking bolts;
11. Install dross bin trolley;
12. Put on drive assembly and chain;
13. Separately form structural frame of structural support members 22 with end cap members 23;
14. Fit protecting cap 26 onto structural support members 22;
15. Put in cross slats 24 and cross slats 25 as a grid assembly onto the structural frame;
16. Place structural frame with grid assembly in place over the side rail members 6 and side plate members 8;
17. Place formed grid on top of structural support members 22.

To those skilled in the art to which the invention relates, many changes in construction and widely differing embodiments and application of the invention will suggest themselves without departing from the scope of the invention as defined in the appended claims. The disclosures and the descriptions herein are purely illustrative and are not intended to be limiting.

BRIEF DESCRIPTION OF THE FIGURES

The invention will now be described, by way of example only, by reference to the accompanying drawings.

DETAILED DESCRIPTION

The following description will describe the invention in relation to preferred embodiments of the invention. The invention is in no way limited to these preferred embodiments as they are purely to exemplify the invention only and possible variations and modifications would be readily apparent without departing from the scope of the invention.

Many existing oxy fuel cutting machines use thicker flat bars to support thick plate cutting, however the plate being cut sits directly on the thick flat bars and the flat bars get cut as the torch crosses them. What the present invention covers is a cutting table that can support very heavy plates and have thinner sacrificial members that sit on and protect the thick flat bars.

Figure 1:
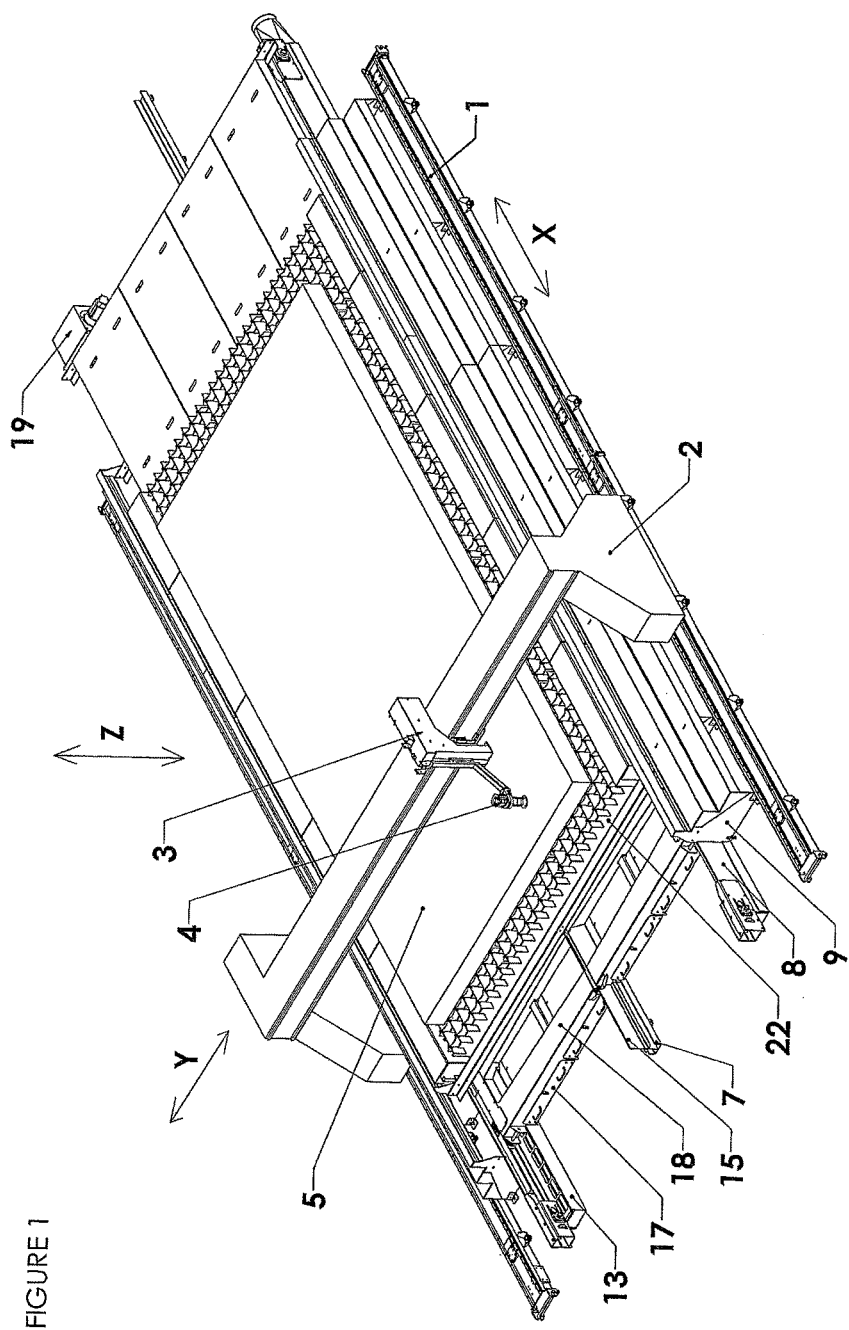
FIG. 1 is a schematic representation of the machine assembly with the cutting table fully assembled with a profile cutting machine.

FIG. 1 shows a profile cutting machine or part thereof which includes a cutting machine gantry 2 that travels in a horizontal plane having an X axis along machine guide rails 1. Mounted to gantry 2 is a machine tool carriage 3 which travels in the horizontal plane at right angles to the X axis in a Y axis along the gantry 2. In this embodiment there are cutting tools 4 which are connected to a cutting head of a single carriage 3 and the tool has a guide and drive system (not shown) to raise and lower the cutting tools 4 in a vertical plane in a Z axis to at least one plate 5 to be cut.

In FIG. 1 the plate 5 to be cut, is supported on a cutting table made up of a supporting frame assembly structure including a flat bar member 22 support and grid assembly supporting plate 5 to enable a travelling fume extraction chamber trolley 18 to travel under flat bar members or support bar members 22 of the cutting table support. In this instance the fume extraction trolley 18 is a travelling bin system that is driven via chains connected to an independently driven motor-gearbox drive means 19. The profile cutting machine can have a fume extraction duct formed by elongate folded plate members 13 and 14 operatively connected to a side rail member 6 (FIG. 2) to have air extracted from inside the bin to remove fumes generated from the cutting head when the fume extraction trolley 18 is located below the cutting tools 4. Fume extraction is typically only used on plasma cutting tables and noton oxy fuel cutting tables.

As shown in FIGS. 1-6 (including all close up views X, W, P, Q, R, S and section TT) the cutting table is formed from a frame of several modular components which involve starting from the bottom and working upwards. The cutting table can be said to form a four sided shape. In this example, the shape can be rectangular in shape whereby there are sides being parallel to the X axis or machine rails 1 which form the length of the table. There are ends which can be located at right angles to the sides and equate to the Y axis but also in the horizontal plane. These terms are not strict but their order does help to orient the cutting table with respect to the gantry 2, carriage 3 and rails 1. Additionally one can say that the top of the cutting table is adapted to provide an upper surface for the plate 5 to rest on, to allow cutting or processing thereon. The cutting table also has a base which provides an opposing surface with respect to the upper surface, to allow the cutting table to rest on or be supported thereon.

The following components can be fabricated from metal such as for example structural steel and are generally elongate in shape being much longer than their width or height and being so many mm thick forming an edge. In use these components are generally oriented to stand upright upon their edges whereby there is a top and a base. In general the term 'outside' refers to a position outside of the overall cutting table and the inside being in reference generally to the inside of the cutting table.

Figure 2:
FIG. 2 is a schematic perspective view of a first part of the cutting table showing the side locators and central support locator

FIG. 2 shows the cutting table having firstly side rail members 6 and middle rail member 7 that are used to form at least part of a base of the cutting table to laterality support the side plates 8 and middle plate 15. Side rail member 6 is formed as an elongate member with an "L" or angle cross section so that in use the flange is located inwardly of the perimeter as seen in FIG. 2. Middle rail member 7 is a channel shaped section which can also be used to channel any waste fluid end to end of the table, as well provide support.

Figure 3:
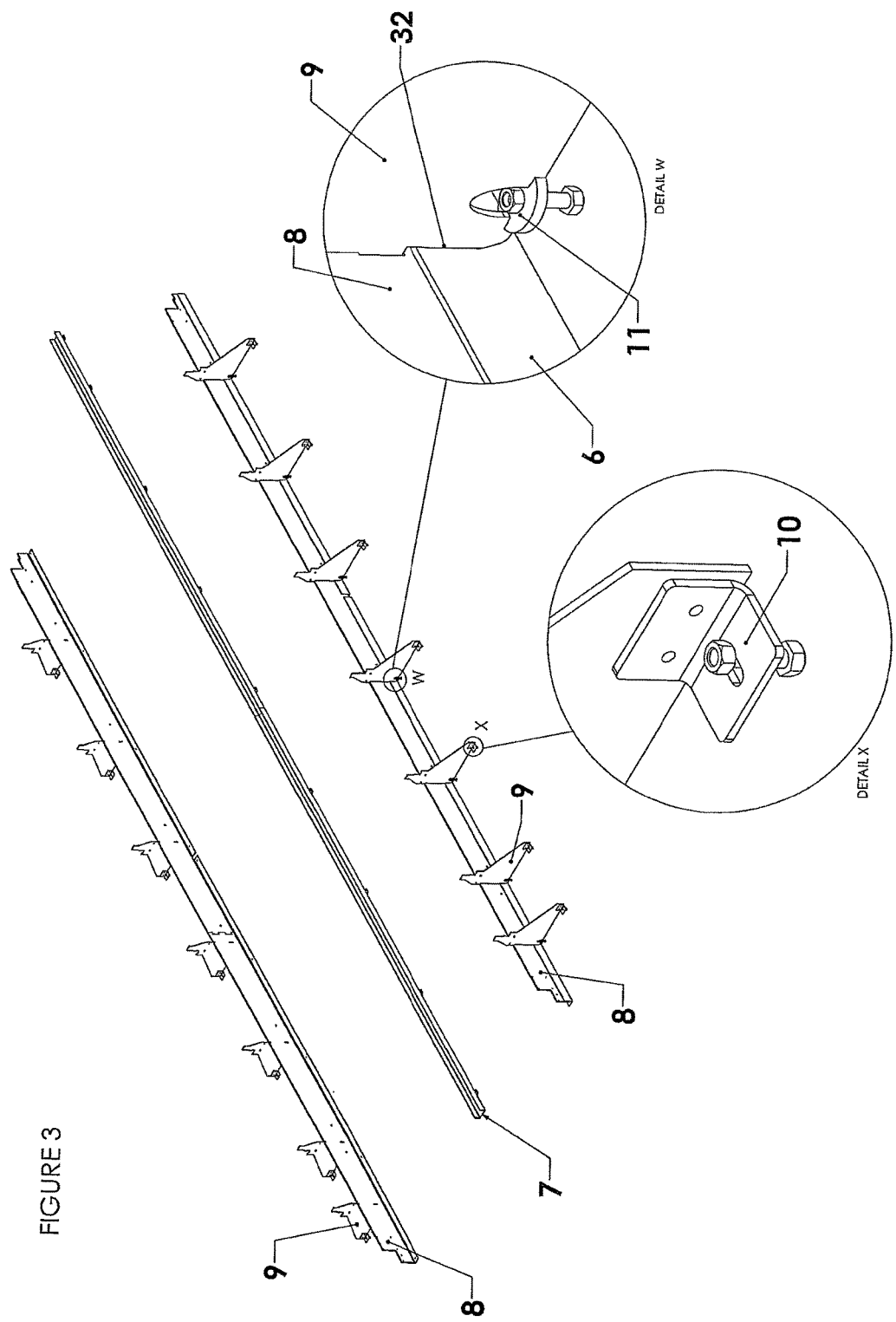
FIG. 3 is a schematic perspective view similar to FIG. 2 but with gusset plate members in place complete with jacking and levelling devices. There are also close up views: Detail X and Detail W.
Figure 5:
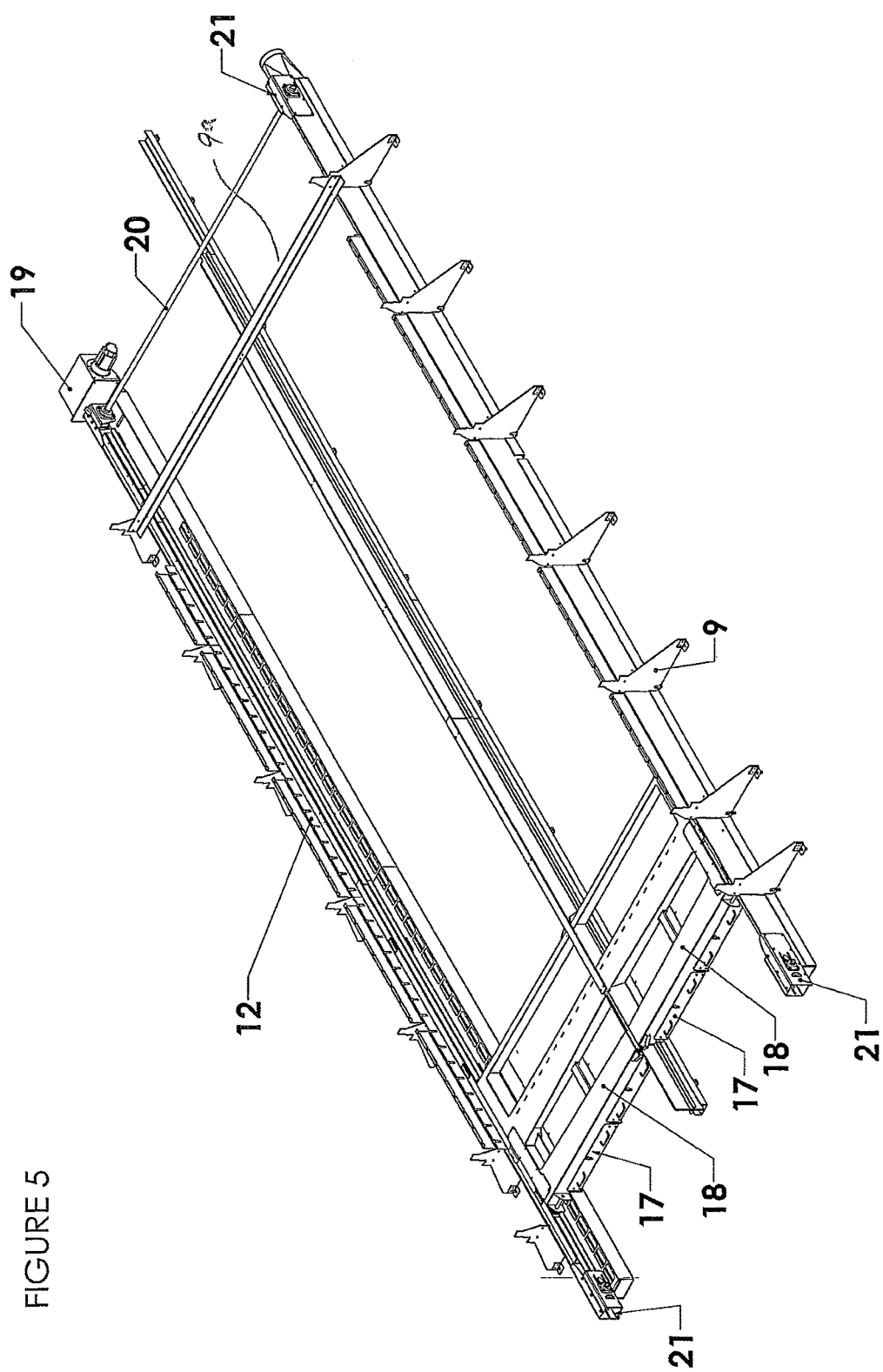
FIG. 5 is a schematic perspective view now with flat bar members travelling trolley and trolley drive system in place

As shown in FIG. 3 side plate members 8 are then side abutted to each side rail member 6 on an inner side whereby gusset plate members 9 are then oriented at right angles to an outer side face of side plate members 8. Gusset plate members 9 are positioned to provide lateral support to the side rails and eventually to the fully assembled cutting table and are formed substantially as triangular shaped members having a vertical slot shaped to allow a side rail member 6 to be recessed therein. Also as shown in FIG. 5 there are end gusset cross rail connecting members 9a which connect the ends of the side rail members 6 and optionally middle rail member 7.

Also the way the table is constructed with side plate members 8 and gusset plate members 9 where the side plate members 8 are kept straight by the side rail members 6 bolted and sealed to a concrete floor, so that the heavy load is directly down through the first cross slats 24 to the side plate members 8 and then to side rail members 6.

In FIG. 3 there is also provided as part of the cutting table, levelling means which is designed to enable one to level the gusset plates 9 and in turn the side rail members 8. The levelling means includes an angle bracket member 10 with adjustable jacking bolt support located at an outer end of the gusset plate 9. The jacking bolt can be chemically bonded to the concrete floor to enable the angle bracket member 10, and thereby the gusset plate 9 to be jacked up or held down. The levelling means can also include another jacking device 11 located underneath the gusset plate 9 and being adjacent to the end of the gusset plate 9 closest to the side rail members 6. Jacking device 11 as shown includes an adjustable supporting bolt with support washer located in a bottom slot of gusset plate 9.

Figure 4:
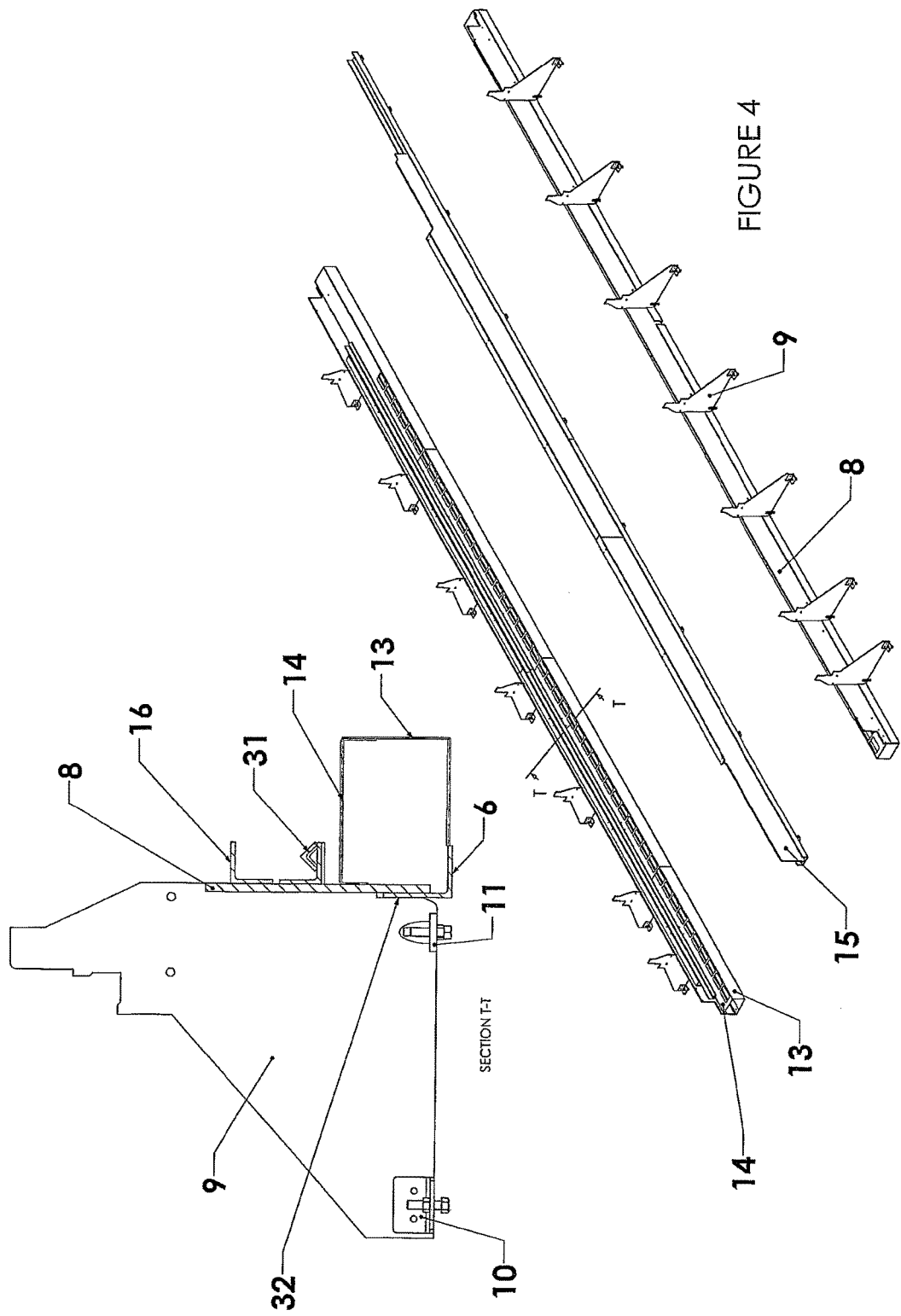
FIG. 4 is schematic perspective view similar to FIG. 3 but now with longitudinal members in place. There is also included Section TT

Also shown are closed chambers the length of the cutting table to enable fume extraction through these chambers which can be square cross sectional hollow members located inside the perimeter as shown in FIG. 4 which can be formed from elongate folded plate members 13 and 14. Elongate folded plate members 14 and 13 are located onto side plate member 8 such that elongate folded plate members 13 and 14 are parallel and form the closed chamber the length of the cutting table to enable fume extraction thru these chambers.

Structural support bar members 22 have slotted interlocking end plate members 23 to hold the support bar members 22 together as a structural frame which are oriented at right angles to the sides of side plate members 8 of the cutting table. This frame can be welded together. The slotted interlocking end plate members 23 are arranged and located to structural support bar members 22 such that a single manageable frame is created supporting the structural support bar members 22 and is able to be lifted and located into the rest of the cutting table and fitted with sacrificial protection capping strip 26.

Additionally after some assembly as shown in FIGS. 1, 2, 3, 4, 5 and 7 one can see that the ends of the side plate members 8 and middle plate member 15 extend beyond the extent of the structural support bar members 22.

Also as shown there is at least one component called middle plate member 15 in the form of a T shaped cross section member which is located intermediate or in the middle of the cutting table being parallel and between the side rail members 6. The T cross section shape has a vertical web and flanges whereby in use this section is located with its flanges within the channel of the middle rail member 7 with the vertical web upward protruding from the channel. Middle rail member 7 functions to provide a possible channel for waste fluid or coolant and provide a base for the middle plate member 15.

Side rail members 6 can be sealed to the concrete floor as seen in FIG. 4 to provide an optional means of containing any waste fluid that spills to the sides of the cutting table.

For very high load cutting tables, at least one intermediate support shown as middle plate member 15 can be used midway or at any desired spacing, of the span between the side plate members 8. Though not shown the figures, the middle plate members 15 can have appropriate connecting means to the structural support bar members 22 and can also be bolted thereto to the substrate or floor via middle rail member 7, to enable the middle plate member 15 to stand upright.

FIG. 4 and Section TT show a further step in the assembly of the cutting table whereby there is now the longitudinal elongate folded plate member 13 is connected to a lower inside of side rail member 6 and to folded plate member 14, and folded plate member 14 is in turn connected to the inside surface of the side plate member 8. The support members 16 and 31 having a generally L shaped cross section with member 31 having another L shaped section connected to the flat portion. Angle 16 as seen in FIG. 4, is used to support the chain return for the driving of the trolley.

FIG. 5 shows a schematic diagram of a partial assembly of the cutting table with trolley 18 driven by drive motor 19 via shaft 20 by chain (not shown) connected to trolley 18.

Figure 6:
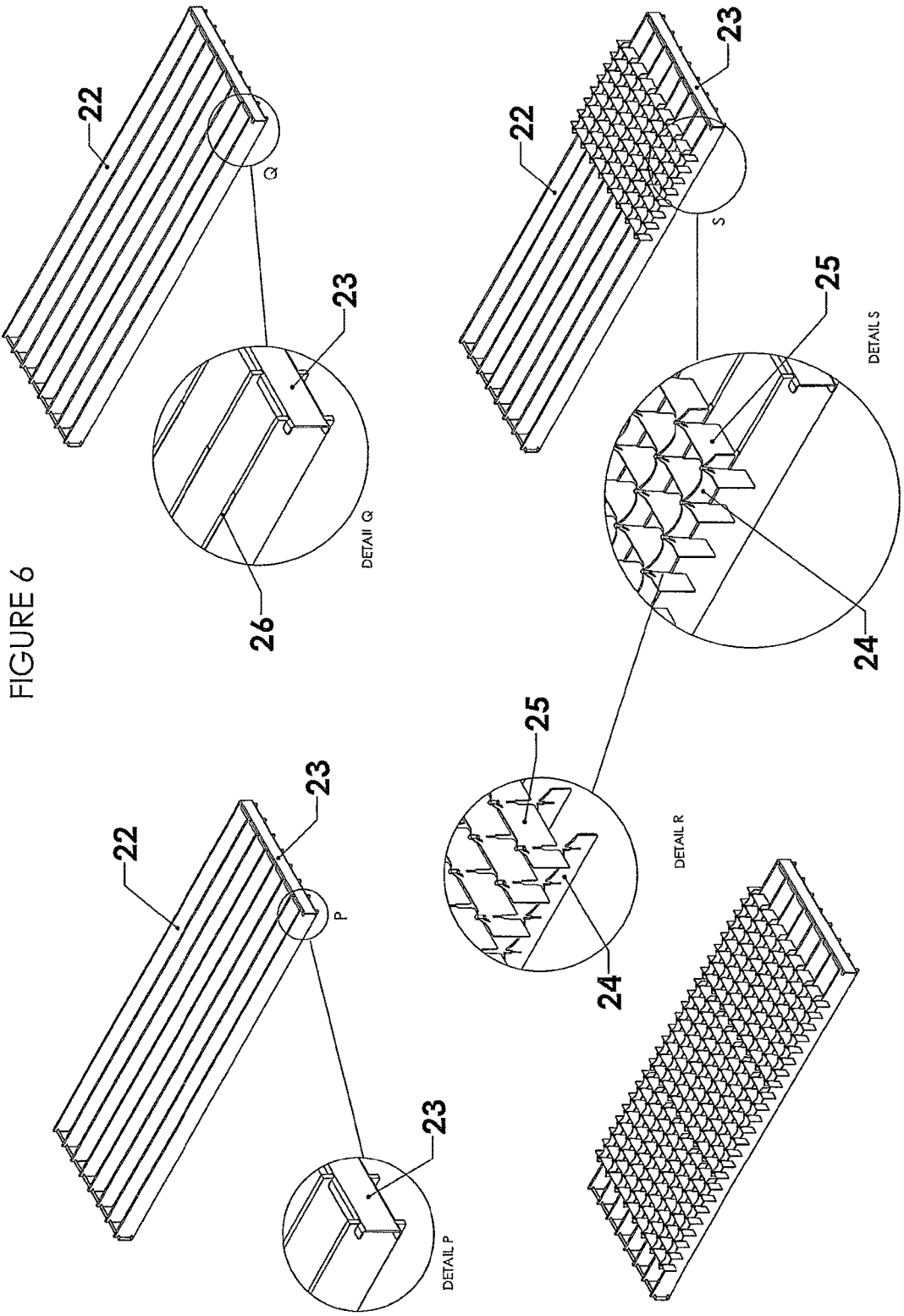
FIG. 6 is a schematic perspective view showing slat support frame construction method and also shows a schematic of the sacrificial grid assembly with cross bar capping member and cross bar members. There are also close views called Detail P, Detail Q and Detail S

FIG. 6 and Details P, Q, R, S show in summary the components that go to make up a sacrificial steel interlocking grid assembly with a structural frame made up of structural support bar members 22 and end plate members 23 which can be welded together to form a structural frame. End plate member 23 can be a channel shape with slots cut out to enable it to receive the vertical oriented structural support bar members 22. Detail P shows end plate member 23 that can be welded to support structural support bar members 22. Detail Q shows sacrificial protection capping strip 26 welded to the top of structural support bar members 22. Detail S shows interlocking assembled sacrificial grid made up of first cross slats 24 and second cross slats 25 on structural support bar members 22. The final schematic shows multiple slat grids assembled and located onto the structural support bar members 22. The first cross slats 24 are oriented in parallel spaced configuration in one direction and the second cross slats 25 are oriented in parallel spaced configuration in an other direction. Also shown are protecting end capping strips 26 which can be channel shaped to simply slot over a portion of the upper end of the structural support bar member 22.

In summary sacrificial interlocking grid assembly is made up of the first cross slats 24 and second cross slats 25. First cross slates 24 are laid parallel with and abutting each structural support bar members 22 but actually sit on the sacrificial protection capping strips 26. Lastly the second cross slats are 25 are laid cross wise and slotted to the first cross slats 24 and structural support bar members 22.

First cross slats 24 are elongate thin steel plate members with spaced cross slat slots along one edge which are oriented when in use to point upwardly whereas the second cross slats 25 have spaced slots facing downwardly so that when the slats are combined, the slots slide into each other by entwining or overlapping with each other whereby the second slat slots slide downwardly over the cross slats as shown.

The sacrificial interlocking grid assembly is supported from below by being slotted onto the rest of the cutting table by having each transverse or flat bar structural support bar members 22 being located on each adjacent side rail member 6 which is slotted to locate flat bar support members 22.

Figure 7:
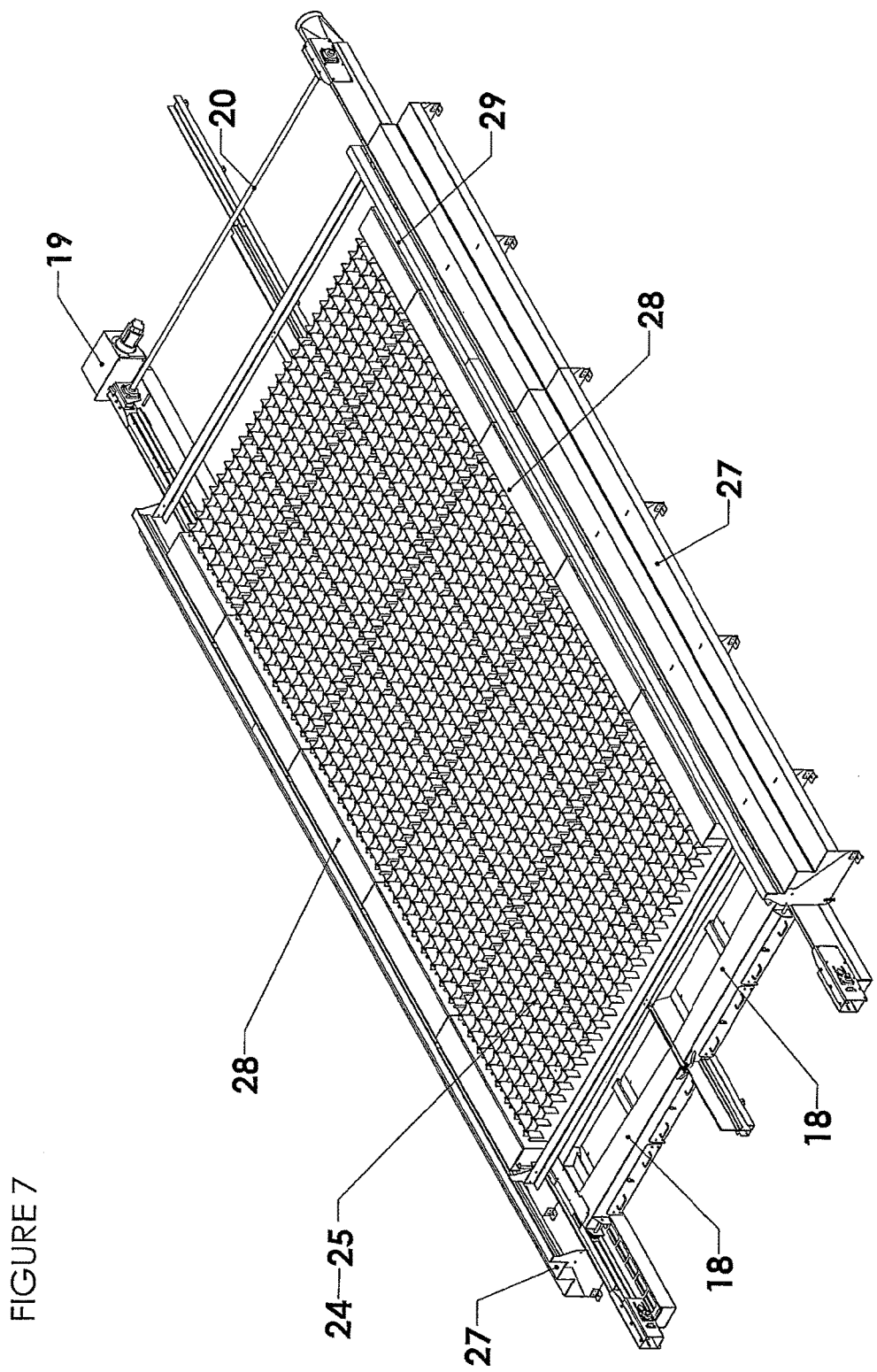
FIG. 7 is a schematic showing a fully assembled cutting table with stairs located down each side and additional flat bar members

FIG. 7 shows a schematic diagram of the cutting table with sacrificial interlocking grid assemblies and also with stairs or folded step capping members 27 that are connected to the side edges of gusset members 9 so that the folded step capping members 27 can provide easy access to the cutting table and a covering to the gusset plates.

Also shown in FIG. 7 is the chain drive apparatus which includes a motor drive 19 and driveshaft 20 located at one end of the cutting table, are constructed to enable a travelling fume extraction system trolley 18 to travel under the support structure via chain drive connected to a sprocket members 21 located at the other end of the cutting table. A fume extraction duct in the form of folded plate members 13 and 14 can be bolted to the inside of the structural steel support plates of side plate members 8.

Angle floor locating sections can be welded to side support 8 when all the table is complete to take vertical loads. Also shown in FIG. 7 is the sacrificial steel interlocking grid assembly which are unitized to fit into the cutting table, located by slat frame locators 12 and supported on side plate member 8 and middle plate member 15.

There is also disclosed several methods of assembly of the cutting table

The method for assembling a cutting table for supporting plate being processed by a cutting machine includes the following sequence of steps:

Assemble each side rail member 6 to form a desired rail length using connecting means to the concrete floor,
locate side rail members 6 in spaced apart orientation parallel commensurate with the length of the table required parallel with guide rails for the gantry to form a perimeter of the cutting table,
arrange and connect gusset plate members 9 on the outside of side plate members 8
locate folded plate members 13 and 14, and support members 31 and 16 onto the inside of the side plate members 8;
Assemble middle rail member 7 and middle plate member 15 and then place it in between and parallel to the side rail members 6.
Assemble sacrificial support assemblies by firstly attaching end plate member 23 to ends of all structural support bar members 22 to form a structural frame and then arrange and locate the slotted sacrificial interlocking grid assembly into the recess, on top of and slotted into the structural support bar members 22 and capping with sacrificial protection capping strips 26.

The sacrificial grid assembly comprising first and second sacrificial cross slats 24 and 25 can be assembled by:
1) laying each first cross slat 24 parallel to and on top of the structural support bar members 22 and capping with sacrificial protection capping strips 26
2) then laying second sacrificial cross slats 25 onto first cross slats 25 by slotting together.

Another method for assembling the cutting table for supporting plate being processed by a cutting machine can include the following sequence of steps:

Bolt with secure connections "L" shaped section side rail members 6 and middle rail member 7 to a concrete floor and parallel with guide rails 1 for the gantry,
locate side plate members 8 in spaced apart orientation parallel commensurate with the length of the table required parallel with guide rails 1 for the gantry,
arrange gusset plate members 9 on outside of the side plate members 8 on the floor or ground and connect thereto (eg by welding) to laterally support an outer side of side plate members 8,
then lower combined gusset plate 9 and side plate member 8 to the side rail member 6 which locates side plate members 8 in the Y direction using a slot 32 provided between side plate member 8 and gusset plate member 9,
Adjust jacking bolt on angle bracket member 10 and jacking device 11 to horizontally level side plate members 8 such that each side plate member 8 is guided vertically by slot 32 and moved vertically to raise each side plate member 8 to the correct height and the jacking bolt in angle bracket member 10 can ensure that side rail 8 is vertical,
Locate support member 31 and support member 16 parallel to the top of side plate member 8 such that support member 31 is a guide for a moving trolley 18 and support member 16 is a support guide for the chain drive for trolley 18,
Locate elongate folded plate members 14 and 13 onto side plate member 8 such that elongate folded plate members 13 and 14 are parallel and form a closed chamber the length of the cutting table to enable fume extraction through these chambers,
Arrange and locate a slotted interlocking end plate 23 to structural support bar members 22 such that a single manageable frame is created and is able to be lifted and located into the cutting table and fitted with sacrificial protection capping strip 26, (see Detail Q).
Arrange and locate the grid assembly of cross slats 24 and 25 on top of and slotted into the structural support bar members 22 whereby the top of the grid assembly forms the top of the cutting table whereby each first cross slat is directly supported by a structural support bar member 22.

After forming and locating the side rail members 6 and before locating the structural support bar members 22 and grid assembly, assemble an middle plate member 15 and then place in between and parallel to the side rail members 6. After positioning the gusset members with side plate members 8 onto side rail members 6, locate end gusset cross rail connecting members 9a to connect the end gussets 9 together.

Slot 32 is a slot that side rail members 6 use to locate a gusset plate member 9 and keep side plate members 8 straight. When side rail member 6 is bolted to the concrete it is able to be set up straight. The gusset members 9 are welded to the side plate members 8 and the there is a slot 32 located between the side plate member 8 and the gusset plate member 9. The side plate members 8 and gusset plate members 9 as a combined member are then lowered down so that the side rail member 6 goes into slot 32.

This slot allows the side plate and gussets to be jacked up but still kept in a straight line Middle rail member 7 and middle plate member 15 can be placed in between the side rail members 6. A gusset plate capping member 29 can be placed only on top of the gusset plate members after the gusset plate members have been installed. A folded step capping member 27 can be placed on the sides of the gusset plate members 9 after the gusset plate members have been installed.

The method can also be described in the following sequence of steps:
1. Put in side rail members 6, in a straight formation and fix to floor;
2. If required for additional support put in middle rail member 7, level and bolt to floor;
3. Put in intermediate plate member 15 if required;
4. Weld Drive chain return support members 16 and 31 to side plate members 8;
5. Weld side plate members 8 with gusset plate members 9;
6. Lower (side plate member 8 combined with gusset plate members 9) onto side rail member 6, into slot 32;
7. Jack up assembly to be level and with side plate members 8 vertical using jacking bolts;
8. Weld extraction chamber folded member 13 to side rail members 6;
9. Bolt extraction chamber folded member 14 to side plate member 8 and extraction chamber folded member 14 to extraction chamber folded member 13;
10. Weld side rail members 6 to side plate members 8 to take the vertical load rather than the jacking bolts;
11. Install dross bin trolley;
12. Put on drive assembly and chain;
13. Separately form structural frame of structural support members 22 with end cap members 23
14. Fit protecting cap 26 onto structural support members 22;
15. Put in first cross slats 24 and second cross slats 25 as a grid assembly onto the structural frame;
16. Place structural frame with grid assembly in place over the side rail members 6 and side plate members 8;
17. Place formed grid on top of structural support members 22.

SCHEDULE OF PARTS OR COMPONENTS

1. Guide rail
2. Gantry
3. Carriage
4. Cutting tool
5. Plate to be cut
6. Side rail members
7. Middle rail member
8. Side plate members
9. Gusset member and 9*a*: End gusset cross rail connecting members
10. Angle bracket member
11. Jacking device
12. Slat frame locator
13. Extraction chamber folded member
14. Extraction chamber folded member
15. Middle plate member
16. Drive chain return support
17. Waste drawer
18. Extraction trolley support frame
19. Extraction trolley drive motor
20. Drive shaft
21. Chain sprocket assembly
22. Structural support bar member
23. Slotted interlocking end plate
24. First cross slat members
25. Second cross slat members
26. Sacrificial protective capping strip
27. Folded step capping member
28. Support bar capping member
29. Gusset plate capping member
30.
31. Drive chain support
32. Slot The present invention in preferred embodiments may have one or more of the following advantages:
a) The cutting table structure using flat bar supports enables heavy plates to be cut
b) Thinner sacrificial slats are directly supported by flat bar supports
c) Angle sections bolted to the floor provide location and lateral table location
d) Flat cut plate and folded plate can be sent to the installation site for simple assembly by bolting and welding of various components.
e) The table components can be broken down for shipment requiring small volume for shipping.
f) The cutting table design enables thick steel plates to over 10" thick to be supported on parts made from simple flat plate parts with foldings.
g) The design incorporates stairs for easy access and also uses the stairs to provide lateral stiffness for the cutting table.
h) Only simple welding is required for assembly.
i) Assembly time is fast and provides substantial savings
j) Steel plate is cheaper than structural section prices ($/lb cost is cheaper) providing substantial savings.
k) Rapid assembly times are possible.
l) Standardized plate sizes.
m) Easy to increase table size
n) No need to weld the cutting table making it much easier to assemble and maintain.
o) No need to have support legs under table for heavy plate loads
p) No legs means that fume extraction underneath table is possible Variations Throughout the description of this specification, the word "comprise" and variations of that word such as "comprising" and "comprises", are not intended to exclude other additives, components, integers or steps.

It will also be understood that where a product, method or process as herein described or claimed and that is sold incomplete, as individual components, or as a "kit of Parts", that such exploitation will fall within the ambit of the invention.

These and other features and characteristics of the present invention, as well as the method of operation and functions of the related elements of structures and the combination of parts and economics of manufacture, will become more apparent upon consideration of the following description with reference to the accompanying drawings, all of which form part of this specification, wherein like reference numerals designate corresponding parts in the various figures.

The use of structural support bar members 22 have their size calculated to hold the desired plate thickness to be cut. These can be connected together with slotted interlocking end plate 23 to make a welded frame for loading into the cutting table. Also the use of the side rail members 6 as angles connected to the floor to keep the side plate members 8 parallel, and when set up, are welded together to transmit the load from the heavy plate 5 to the floor.

Also the use of flat side supports and gussets, which can be welded or bolted together.

Terms like "inner" and "outer" refer to a position with respect to the area that the cutting table covers. Additionally terms like "longitudinal" can refer to an axis parallel to the sides of the cutting table which is parallel to machine guide rails 1 which are in turn at right angles to the movement of the carriage on the gantry.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However it is to be understood that the invention may assume various alternative variations, except where expressly specified to the contrary. It is also to be understood that the specific devices illustrated in the attached drawings, and described in the following specification are simply exemplary embodiments of the invention. Hence specific dimensions and other physical characteristics related to the embodiments disclosed herein are not to be considered as limiting.

The cutting table can be any shape as required. Though in this example a rectangular shape is shown, other shapes are equally possible like for example, square shaped, as long as it is possible for the gantry 2 to be able to move over the cutting table and allow the carriage 3 to be able to move in the opposite direction and also move vertically. Steel is disclosed as the preferred type of material though other materials are also possible utilizing the disclosed method of modular components. Any plate can be utilized by the table such as for example heavy or thick plate which can typically be between 8' and 12' wide and often have lengths from 20' to 200' long.

The side rail members 6 and middle rail members 7 can be made of any number components that allow simple plate and bolt connecting. As seen in the figures there is only one middle rail being shown but equally there can be any number of such middle rails.

Another method of fume extraction is not to use a travelling bin under the supports for the plate being cut but instead to use flaps in a duct along the length of the cutting table that open adjacent in the X axis to the torch creating the fumes. Typically a device mounted to the gantry of the machine opens the flaps as the machine moves down the table.

I claim:

1. A cutting table for supporting a flat metal plate to be processed, wherein the cutting table comprises:
   at least one module comprising:
   at least two longitudinal end plate members which extend along a longitudinal X axis and are spaced apart a transverse distance Y; and
   a plurality of spaced apart flat bar members which are supported by said end members and which span distance Y between said end members, said end members and flat bar members of the at least one module being oriented so that faces of said spaced apart flat bar members all have, in use, a vertical orientation; and
   a sacrificial interlocking grid assembly formed by a set of first cross slat members and a set of second slat cross members, the set of first cross slat members being interlocked with the set of second cross slat members, said sacrificial interlocking grid assembly supported on top of the spaced apart flat bar members and configured to support the flat metal plate to be processed.

2. The cutting table as claimed in claim 1, wherein the cutting table comprises a plurality of modules that together form the cutting table.

3. The cutting table as claimed in claim 2, wherein the modules are each supported by a supporting frame assembly comprising side plate members supported on side rail members, and middle plate members supported on middle rail members, the side rail members and side plate members extending substantially parallel to each other along the X-axis, and the middle rail members and middle plate members extending substantially parallel to and between the side rail members and side plate members.

4. The cutting table as claimed in claim 3, wherein the side plate members are laterally supported by gussets, the gussets comprising means to level the side plate members.

5. The cutting table as claimed in claim 4, wherein the gussets are connected by a gusset capping member for further stabilising the gussets, the gusset capping member positioned in use at a height corresponding to an underside of the flat metal plate to be processed.

6. The cutting table as claimed in claim 3, wherein the side rail members are configured to fluidly seal a floor underneath the cutting table.

7. The cutting table as claimed in claim 3, wherein the modules are supported by slat frame locators, the slat frame locators supported on the side plate members and middle plate member, the bar members of the modules supported in slots formed in the slat frame locators.

8. The cutting table as claimed in claim 3, wherein the side plate members and middle plate members are in the form of elongate substantially flat steel plate members having faces which are oriented substantially vertically.

9. The cutting table as claimed in claim 1, wherein the set of first cross slat members and the set of second cross slat members are slideably interwoven, and the set of first cross slat members are supported on the spaced apart flat bar members of the at least one module.

10. The cutting table as claimed in claim 9, wherein the interlocking grid assembly is configured to slideably interfit on top of the flat bar members of the at least one module.

11. The cutting table as claimed in claim 9, wherein the set of first cross slat members and the set of second cross slat members are in the form of planar members having spaced slots therein and being oriented and slotted together to form the grid assembly, the grid assembly having a substantially uniform height, the set of first cross slat members oriented in parallel spaced configuration in the X-axis and the set of second cross slat members oriented in parallel spaced configuration in a Y-axis.

12. The cutting table as claimed in claim 9, wherein the spaced apart flat bar members comprise a greater depth and thickness than the set of first cross slat members and the set of second cross slat members.

13. The cutting table as claimed in claim 9, wherein each module comprises protective capping members on upper edges of the spaced apart flat bar members underneath the set of first cross slat members.

14. The cutting table as claimed in claim 13, wherein the protective capping members are sacrificial and protect the spaced apart bar members from waste produced during processing of the flat metal plate.

15. A cutting table for supporting a flat metal plate to be processed, wherein the cutting table comprises:
   at least one module comprising:
   at least two longitudinal end members which extend along a first axis and are spaced apart a designated distance; and
   a plurality of spaced apart flat bar members which are supported by said longitudinal end members and span said designated distance between said longitudinal end members, said longitudinal end members and said spaced apart flat bar members of the module being oriented so that faces of said end members and said spaced apart flat bar members all have a vertical orientation; and a sacrificial interlocking grid assembly supported on top of the spaced apart flat bar members, said sacrificial interlocking grid assembly configured to support the flat metal plate to be processed.

\* \* \* \* \*